(12) United States Patent
Thiagarajan et al.

(10) Patent No.: US 11,741,194 B2
(45) Date of Patent: Aug. 29, 2023

(54) SYSTEM AND METHOD FOR CREATING HEALING AND AUTOMATION TICKETS

(71) Applicant: Cognizant Technology Solutions India Pvt. Ltd., Chennai (IN)

(72) Inventors: Srinivasan Thiagarajan, Chennai (IN); Saritha Panapparambil Abubacker, Chennai (IN); Surendranathan Ardhanari, Chennai (IN); Vinoth Kumar Devarajan, Chennai (IN); Yuvarajan Mani, Coimbatore (IN); Suganya Thirumalaisamy, Pollachi (IN); Saranya Nedumaran, Chennai (IN); Vijayalakshmi Senthilkumar, Coimbatore (IN); Manikandan Namasivayam, Puducherry (IN); Radha Ponram, Coimbatore (IN); Monalisa Behera, Bhubaneswar (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 17/130,756

(22) Filed: Dec. 22, 2020

(65) Prior Publication Data
US 2021/0295426 A1  Sep. 23, 2021

(30) Foreign Application Priority Data

Mar. 23, 2020 (IN) .............................. 202041012447

(51) Int. Cl.
*G06N 20/10* (2019.01)
*G06F 18/24* (2023.01)
*G06Q 40/02* (2023.01)

(52) U.S. Cl.
CPC ............. *G06F 18/24* (2023.01); *G06N 20/10* (2019.01); *G06Q 40/02* (2013.01)

(58) Field of Classification Search
None
See application file for complete search history.

(56) References Cited

U.S. PATENT DOCUMENTS

| | | | |
|---|---|---|---|
| 6,353,902 B1 * | 3/2002 | Kulatunge | H04L 41/149 714/48 |
| 7,711,576 B1 * | 5/2010 | Duett | G06Q 10/06 707/719 |

(Continued)

OTHER PUBLICATIONS

S. Charalampidou, A. Ampatzoglou, A. Chatzigeorgiou and N. Tsiridis, "Integrating Traceability Within the IDE to Prevent Requirements Documentation Debt," 2018 44th Euromicro Conference on Software Engineering and Advanced Applications (SEAA), 2018, pp. 421-428 (Year: 2018).*

(Continued)

*Primary Examiner* — Mohammad Z Shaikh
(74) *Attorney, Agent, or Firm* — Cantor Colburn LLP

(57) ABSTRACT

The present invention relates to a system and method for application debt management with zero maintenance strategy that make the applications "fit for use" and "fit for purpose". The objective is to ensure that applications run at the lowest cost, deliver maximum performance and serve the purpose for which it was developed. The machine learning enabled debt engine of present system reads the unstructured ticket data or debts, eliminates noise, and classify the debts into one of predefined categories. This is followed by remediation of debt via either of automation or healing workbench based on predetermined priorities.

20 Claims, 1 Drawing Sheet

(56) References Cited

U.S. PATENT DOCUMENTS

| | | | | |
|---|---|---|---|---|
| 9,959,161 | B2* | 5/2018 | Claypool, III | G06F 11/0766 |
| 10,067,760 | B2* | 9/2018 | Ryali | G06N 5/00 |
| 10,270,644 | B1* | 4/2019 | Valsecchi | G06N 5/04 |
| 10,430,517 | B1* | 10/2019 | Mulwad | G06F 11/0793 |
| 10,438,212 | B1* | 10/2019 | Jilani | G06N 5/025 |
| 10,489,728 | B1* | 11/2019 | Siconolfi | G06Q 10/063112 |
| 10,643,212 | B2* | 5/2020 | Pender | G06Q 20/4014 |
| 10,860,451 | B1* | 12/2020 | Murthy | G06F 11/3075 |
| 10,887,157 | B1* | 1/2021 | Fletcher | H04L 41/0622 |
| 11,270,226 | B2* | 3/2022 | Meng | G06F 16/35 |
| 11,556,843 | B2* | 1/2023 | Backas | G06N 7/01 |
| 11,587,094 | B2* | 2/2023 | Tzur | G06Q 30/016 |
| 2008/0201279 | A1* | 8/2008 | Kar | G06Q 30/02 706/12 |
| 2010/0017350 | A1* | 1/2010 | Kar | G06F 40/205 706/12 |
| 2013/0198116 | A1* | 8/2013 | Bhamidipaty | H04L 41/069 706/12 |
| 2013/0205007 | A1* | 8/2013 | Ayachitula | G06F 9/5072 709/224 |
| 2015/0317580 | A1* | 11/2015 | Glissmann-Hochstein | G06Q 10/0639 705/7.38 |
| 2016/0110723 | A1* | 4/2016 | Shimpi | G06F 16/38 705/304 |
| 2017/0372231 | A1* | 12/2017 | Ghatage | G06F 40/58 |
| 2018/0032601 | A1* | 2/2018 | Venkataraman | G06F 16/285 |
| 2018/0108022 | A1* | 4/2018 | Bandera | G06Q 10/06316 |
| 2018/0247218 | A1* | 8/2018 | Fiumara | G06N 5/022 |
| 2019/0132191 | A1* | 5/2019 | Mann | G06F 11/30 |
| 2019/0228342 | A1* | 7/2019 | El Sayyed | G06F 16/254 |
| 2019/0361760 | A1* | 11/2019 | Krishnan | G06F 11/076 |
| 2020/0065151 | A1* | 2/2020 | Ghosh | G06F 40/30 |
| 2020/0162312 | A1* | 5/2020 | Balasubramanian | G06N 5/022 |
| 2020/0204431 | A1* | 6/2020 | Bah, I | H04L 41/16 |
| 2020/0204680 | A1* | 6/2020 | Prakash | G06N 20/10 |
| 2020/0293946 | A1* | 9/2020 | Sachan | G06N 5/04 |
| 2020/0401849 | A1* | 12/2020 | Kansal | G06N 20/20 |
| 2021/0004706 | A1* | 1/2021 | Riddle | G06Q 10/10 |
| 2021/0019648 | A1* | 1/2021 | Backas | G06V 10/764 |
| 2021/0097551 | A1* | 4/2021 | Tzur | G06Q 30/016 |

OTHER PUBLICATIONS

R. Rebouças de Almeida, U. Kulesza, C. Treude, D. Cavalcanti Feitosa and A. Higino Guedes Lima, "Aligning Technical Debt Prioritization with Business Objectives: A Multiple-Case Study," 2018 IEEE International Conference on Software Maintenance and Evolution (ICSME), 2018, pp. 655-664, (Year: 2018).*

S. P. Paramesh, C. Ramya and K. S. Shreedhara, "Classifying the Unstructured IT Service Desk Tickets Using Ensemble of Classifiers," 2018 3rd International Conference on Computational Systems and Information Technology for Sustainable Solutions (CSITSS), 2018, pp. 221-227, (Year: 2018).*

S. Magdalene-Glissmann and H. Ludwig, "Value cost impact analysis: Estimating the IT cost impact of business developments," 2013 IFIP/IEEE International Symposium on Integrated Network Management (IM 2013), 2013, pp. 1225-1232. (Year: 2013).*

S. Akbarinasaji and A. Bener, "Adjusting the Balance Sheet by Appending Technical Debt," 2016 IEEE 8th International Workshop on Managing Technical Debt (MTD), 2016, pp. 36-39 (Year: 2016).*

Y. Diao, H. Jamjoom and D. Loewenstern, "Rule-Based Problem Classification in IT Service Management," 2009 IEEE International Conference on Cloud Computing, 2009, pp. 221-228 (Year: 2009).*

Atlintas, Muchait; Tantug, Cuney, D, "Machine Learning Based Ticket Classification Issue Tracking Systems", Proceeding of the International Conference on Artificial Intelligence and Computer Science (AICS 2014), Sep. 15-16, 2014, pp. 195-207. (Year: 2014).*

Y. Temprado, F. J. Molinero, C. Garcia and J. Gomez, "Knowledge Discovery from Trouble Ticketing Reports in a Large Telecommunication Company," 2008 International Conference on Computational Intelligence for Modelling Control & Automation, Vienna, Austria, 2008, pp. 37-42. (Year: 2008).*

Brett Sparks, "Cost Optimization Crisis Recovery Actions for Application Services Leaders", Published Jul. 13, 2020, Gartner, Inc., URL: https://www.gartner.com/document/code/327748?ref=dochist.

Myles F. Suer, "Digging into tech debt", CIO, Nov. 14, 2018, URL: https://www.cio.com/article/3321377/digging-into-tech-debt.html.

* cited by examiner

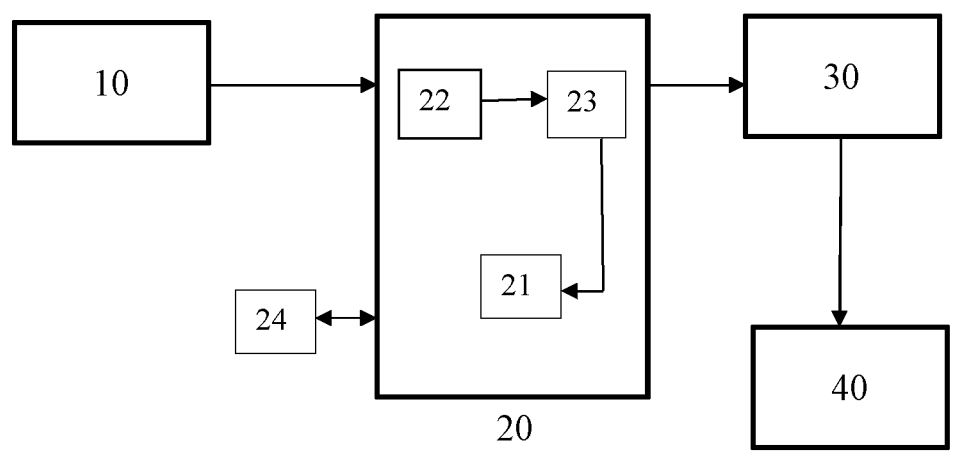

SYSTEM AND METHOD FOR CREATING HEALING AND AUTOMATION TICKETS

CROSS REFERENCE TO RELATED APPLICATION

This application is related to and claims the benefit of Indian Patent Application Number 202041012447 filed on Mar. 23, 2020, the contents of which are herein incorporated by reference in their entirety.

FIELD OF INVENTION

The subject matter described herein, in general, relates to a system and method for interactive application debt management, and, in particular, relates to an artificial intelligence based system and method for enabling auto-pilot application debt management within an enterprise.

BACKGROUND OF INVENTION

Application debt reduction is handled as problem management in reactive or proactive way. Even in proactive problem management, the incident reduction is done as a transactional process. Application maintenance is referenced synonymously to service management, where service is the focal point. It is aptly governed by metrics like resolution time, response time, request fulfillment time etc., which propels delivery of services faster, better and cheaper.

Commonly, the applications accumulate four kinds of debts over a period, namely, Technical, Functional, Operational and Knowledge debts. The debts accumulate due to various reasons including compromised code quality, design quality, test quality, partially addressed requirements, poor maintenance, lack of process, tools, training, agility, so on and so forth, which manifests itself as incident, service requests and manual activities.

Further, in traditional application maintenance, few insights are generated to identify why the number of incidents and problem tickets keeps rising, permitting limited visibility with regard to prioritization of problem solving in a typical application maintenance process. Handling application maintenance as service management based issue of automating everything without applying the due diligence of what should be automated or how to improve application quality has been a pending problem. Furthermore, unstructured ticket data is seldom exposed by the customer, making insufficient/inconsistent ticket or data availability a further challenge. Lastly, multi-lingual data sets advance the problem of curating data.

Thus, application maintenance cost increases exponentially besides making application increasingly rigid towards any functional changes. This affects the agility of the organization to launch new products/services in market; limiting their capability to attract/retain market share. In the background of foregoing limitations of traditional maintenance and debt management mode, there exists a need for a system and method that can suitably make applications fit for use and fit for purpose at lower cost, and develop an adaptive plan to assure maximum performance of services for which it was developed.

OBJECTS OF THE INVENTION

The primary object of the present disclosure is to provide a system and method for application debt management and maintenance in a better informed and more financially viable way.

Another object of this disclosure is to provide an artificial intelligence based system and method of maintaining applications by making them fit for use and fit for purpose for enhanced operational and financial performance.

Yet another object of the disclosure is to provide an application maintenance system and method that delivers maximum performance and best serve the purpose for which the application was developed.

Yet other object of the present disclosure is to provide a highly dynamic system and method for smart governance with visual dashboards for executing business processes.

In yet another object, the disclosure provides an economized system and method of application maintenance that minimizes application debt across portfolio, thereby saving on cost and unwarranted expenses.

In still another object of present disclosure, the system and method facilitates increased funding for strategic application development and IT initiatives within any organization.

In one other object of present disclosure, the increased application service levels improve customer satisfaction through reduced outages and slow downs.

In yet another object of present disclosure, application quality is improved with identification of right candidate for automation of applications and products.

These and other objects will become apparent from the ensuing description of the present invention.

BRIEF DESCRIPTION OF THE DRAWINGS

FIG. 1 is a block diagram of a system implementing the application debt management, in accordance with a preferred embodiment of the present disclosure.

DETAILED DESCRIPTION OF THE EMBODIMENTS

In describing the preferred and alternate embodiments of the present disclosure, specific terminology is employed for the sake of clarity. The disclosure, however, is not intended to be limited to the specific terminology so selected, and it is to be understood that each specific element includes all technical equivalents that operate in a similar manner to accomplish similar functions. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms.

The present disclosure is described below with reference to methods and systems in accordance with general embodiments for auto-pilot application debt management. The instructions may be loaded into the system, which when executed upon such a computer-implemented system—a general-purpose computer or a special purpose hardware based computer systems, creates means for training the system and implementing functions of various modules hosted by the system. It has to be understood and acknowledged for this specification and claims, that the terms "ticket data" or debt are interchangeably used.

According to its major aspects as broadly stated, the present disclosure in its preferred form provides a system and method for application debt management. More precisely, the system enables application maintenance to make the applications "fit for use" and "fit for purpose", and delivers maximum performance for set of services for which it was developed. This allows the leaders in making better decisions as they quantifiably understand and assess various application maintenance debts and their impact on organization. In one preferred aspect of present disclosure, the system and method employs artificial intelligence (AI)/ machine learning (ML) driven techniques to reduce the non-discretionary spend on application maintenance activity.

By applying a structured, consistent, automated approach to supporting applications, IT Organizations can reduce the spending, increase the repair accuracy, and minimize application debt across the portfolio. This can eventually free up the budget for more strategic business imperatives. Orchestrating and industrializing such journey demanded a platform based approach and paved way for the development of application debt management system and method of present disclosure.

Referring now to FIG. 1, a functional block diagram of system 100 for application maintenance and debt management is illustrated. In general, the system 100 comprises of a ticketing module 10, a debt engine 20, a debt remediation engine 30, and a reporting dashboard 40. The system 100 along with its various components and sub-components facilitates end to end zero maintenance strategy. Further, it helps to drive business relevance and increases application lifetime using data driven approach.

Next, a schematic representation of the system 100 with enhanced capability of prioritizing issue resolution for better ROI, is proposed. Broadly, the ticketing module 10 is designed to read the structured or unstructured ticketed data as well as operational data by connecting to any of best-suited IT service management tools generally available, through application programming interfaces (APIs). Structured ticket data could be system alerts for job failures, system anomalies and standard service requests in templatized format. On the other hand, unstructured data could be user queries or issues written in contextualized text statements by the end users. Such an unstructured ticket data might hold multi-fold conversation history with detailed logs about the problem statement and resolution provided by the support engineer.

In one working embodiment, the ticketing module 10 enables effort tracking against ticketed and non-ticketed activities. This effort data helps in benchmarking and identifying opportunities for debt reduction. The advantages of ticketing module 10 includes work inflow trend, productivity analysis of employees when adding functionality or removing bugs, tracking effort at ticket level thereby helping monitoring the schedule overrun, imparting agility to enable adapting to changing customer and market needs by realizing zero maintenance strategy.

Next, the debt engine 20 reads the ticket data from ticketing module 10 and eliminates the noise words embedded therein. For the same, the system is loaded with pre-defined set of stop words based on standards and learnings from other similar user groups. In one preferred embodiment, the debt engine 20 offers flexibility to users for customization of the noise words depending on their own patterns. This noise elimination ensures that the pattern extraction is meaningful and specific to the client's context.

In next working embodiment, such a pre-processed ticket data is tokenized to extract the nature of work. In one exemplary embodiment, the debt engine 20, equipped with best fit algorithms such as Latent Semantic Analysis machine learning (ML) algorithm, Graphical clustering, DB Scan clustering, Association Rule mining, Stratified sampling, SVM classifier, IDF based information extractor, Jaccard similarity, rule based classification and the like. These best-fit algorithms configured debt engine 20 to ably recognize the issues, cleanly categorize the patterns, debt rule extraction and classification within the processed ticket data. Also, they are applied based on customer's context. This is followed by a classification of ticket data, based on the issue and nature of resolution provided, by an ML enabled debt classifier 21 (as shown in FIG. 1), into either of technical, functional, operational, knowledge debt categories and probable debt treatment mechanisms such as avoidable and automatable debts for application.

Now, the debt engine 20 is integrated with a learning web 24 of debt classification rules from a broad database of customers spanning generally across more than ten domains. Debt classification rule has the capability to finely categorize the debt type and remediation method by referring to the similar technology, domain, nature of issue, root cause of the problem and resolution methodology. Most of the tickets are getting auto classified through learning web. In exceptional cases, few tickets might remain unclassified where a supervised learning method is used.

Table 1 below exemplarily shows the work pattern extraction from the unstructured ticket data.

TABLE 1

| Ticket ID | Application Name | Application Typename | Technology Name | Ticket Description | Cause Code | Resolution Code | Desc_Base Work Pattern | Desc_Sub Work Pattern |
| --- | --- | --- | --- | --- | --- | --- | --- | --- |
| 148224 | iRider | Custom built | C#.Net | Abended Job-VGTS_EC_NL_LMLWY_AM_IMP due to as of date mismatch | Data Issue | Job Rerun | abended job | date mismatch |
| 148245 | iRider | Custom built | C#.Net | Abended Job-VGTS_EC_NL_LMLWY_AM_IMP due to as of date mismatch | Data Issue | Job Rerun | abended job | date mismatch issue |
| 148246 | iRider | Custom built | C#.Net | Abended Job-VGTS_EC_NL_LMLWY_AM_IMP due to as of date mismatch | Data Issue | Job Rerun | abended job | date mismatch issue |

TABLE 1-continued

| Ticket ID | Application Name | Application Typename | Technology Name | Ticket Description | Cause Code | Resolution Code | Desc_Base Work Pattern | Desc_Sub Work Pattern |
|---|---|---|---|---|---|---|---|---|
| 148137 | iRider | Custom built | C#.Net | Abended Job-VBRG_BHF_LOAN_POS_IMP due to timeout error | Data Issue | Job Rerun | abended job | timeout error |
| 148152 | iRider | Custom built | C#.Net | Abended Job-VBRG_BHF_LOAN_POS_IMP due to timeout error | Data Issue | Job Rerun | abended job | vbrgad xposap acimp timeout error |
| 148158 | CLS-Commercial Loan | Custom built | C#.Net | Abended Job-VBRG_BHF_LOAN_POS_IMP due to timeout error | Data Issue | Job Rerun | abended job | vbrgad xposap acimp timeout error |
| 148141 | CLS-Commercial Loan | Custom built | C#.Net | Abended Job-VBIR_BI_FACTORSYNC_3 | Data Issue | Job Rerun | abended job | 0 |
| 148143 | CLS-Commercial Loan | Custom built | C#.Net | Abended Job-VEDM_MASTER_PROCESS_MONTHEND | Data Issue | Job Rerun | abended job | 0 |
| 148159 | CLS-Commercial Loan | Custom built | C#.Net | Abended Job-VDRDB_EVREPRECON | Data Issue | Job Rerun | abended job | 0 |
| 156466 | CLS-Commercial Loan | Custom built | C#.Net | [EXT] Delay Notification Email for the AMRS package and date May 29, 2018 | Data Issue | Job Rerun | 0 | 0 |

Based on the work patterns and existing ticket attributes, clustering happens and representative data set is extracted from the input data. This data set is run against the debt classifier that uses rule from learning web to auto classify the debt category and treatment method as shown in Table 2 below:

TABLE 2

| Ticket ID | Application Name | Application Type name | Technology Name | Cause Code | Resolution Code | Desc_Base Work Pattern | Desc_Sub Work Pattern | Debt Classification | Avoidable Flag | Residual Debt |
|---|---|---|---|---|---|---|---|---|---|---|
| 148141 | CLS-Commercial Loan System | Custom built | C#.Net | Data Issue | Job Rerun | abended job | 0 | Operational | Yes | No |
| 148158 | CLS-Commercial Loan System | Custom built | C#.Net | Data Issue | Job Rerun | abended job | vbrgadx posapacimp timeout error | Operational | Yes | No |
| 148224 | iRider | Custom built | C#.Net | Data Issue | Job Rerun | abended job | date mismatch | Operational | Yes | No |
| 148246 | iRider | Custom built | C#.Net | Data Issue | Job Rerun | abended job | date mismatch issue | Operational | Yes | No |
| 148137 | iRider | Custom built | C#.Net | Data Issue | Job Rerun | abended job | timeout error | Operational | Yes | No |
| 148152 | iRider | Custom built | C#.Net | Data Issue | Job Rerun | abended job | vbrgadx posapacimp timeout error | — | — | — |

The un-classified data is then sent for Subject Matter Expert's input for supervised learning, as shown in Table 3 below:

TABLE 3

| Ticket ID | Application Name | Application Typename | Technology Name | Cause Code | Resolution Code | Desc_Base WorkPattern | Desc_Sub_ Work Pattern | Debt Classification | Avoidable Flag | Residual Debt |
|---|---|---|---|---|---|---|---|---|---|---|
| 148152 | iRider | Custom built | C#.Net | Data Issue | Job Rerun | abended job | vbrgad xposapacimp timeout error | Operational | Yes | No |

In next working embodiment, the above auto classified and SME classified dataset are combined and sent for debt rule extraction, as represented in Table 4 below:

TABLE 4

| Dept | Ticket ID | App Name | App Type name | Tech Name | Cause Code | Resolution Code | Desc_ base_ Work patterns | Desc_ Sub_ Work pattern | Debt Classification | Avoidable Flag | Residual Debt |
|---|---|---|---|---|---|---|---|---|---|---|---|
| Insurance | 148141 | CLS-Commercial Loan System | Custom built | C#. Net | Data Issue | Job Rerun | abended job | 0 | Operational | Yes | No |
| Insurance | 148158 | CLS-Commercial Loan System | Custom built | C#. Net | Data Issue | Job Rerun | abended job | vbrgad xposapacimp timeout error | Operational | Yes | No |
| Insurance | 148224 | iRider | Custom built | C#. Net | Data Issue | Job Rerun | abended job | date mismatch | Operational | Yes | No |
| Insurance | 148246 | iRider | Custom built | C#. Net | Data Issue | Job Rerun | abended job | date mismatch issue | Operational | Yes | No |
| Insurance | 148137 | iRider | Custom built | C#. Net | Data Issue | Job Rerun | abended job | timeout error | Operational | Yes | No |
| Insurance | 148152 | iRider | Custom built | C#. Net | Data Issue | Job Rerun | abended job | vbrgad xposapacimp timeout error | Operational | Yes | No |
| Insurance | 148245 | iRider | Custom built | C#. Net | Data Issue | Job Rerun | abended job | date mismatch issue | Operational | Yes | No |
| Insurance | 148143 | CLS-Commercial Loan System | Custom built | C#. Net | Data Issue | Job Rerun | abended job | 0 | Operational | Yes | No |
| Insurance | 148159 | CLS-Commercial Loan System | Custom built | C#. Net | Data Issue | Job Rerun | abended job | 0 | Operational | Yes | No |

Next, in Rule extraction, all the ticket attributes are primarily divided into two item sets. One have the list of attributes which are consider to be important to decide debt, while another item sets have the actual debt attributes. Based on the two-item sets relation, contextualized rules will be extracted and fed back to learning web, as shown in Table 5.

TABLE 5

| Rule ID | App Name | App Type name | Tech Name | Cause Code | Resolution Code | Desc_ base_ Work patterns | Desc_ Sub_ Workpattern | Debt Classification | Avoidable Flag | Residual Debt | Rule Accuracy | Occurence |
|---|---|---|---|---|---|---|---|---|---|---|---|---|
| 1 | CLS-Commercial Loan System | Custom built | C#. Net | Data Issue | Job Rerun | abended job | vbrgadxpo sapacimp timeout error | Operational | Yes | No | 100 | 1 |
| 2 | iRider | Custom built | C#. Net | Data Issue | Job Rerun | abended job | date mismatch | Operational | Yes | No | 100 | 1 |
| 3 | iRider | Custom built | C#. Net | Data Issue | Job Rerun | abended job | timeout error | Operational | Yes | No | 100 | 1 |

TABLE 5-continued

| Rule ID | App Name | App Type name | Tech Name | Cause Code | Resolution Code | Desc_base_Work patterns | Desc_Sub_Workpattern | Debt Classification | Avoidable Flag | Residual Debt | Rule Accuracy | Occurence |
|---|---|---|---|---|---|---|---|---|---|---|---|---|
| 4 | iRider | Custom built | C#.Net | Data Issue | Job Rerun | abended job | vbrgadxpo sapacimp timeout error | Operational | Yes | No | 100 | 1 |
| 5 | iRider | Custom built | C#.Net | Data Issue | Job Rerun | abended job | date mismatch issue | Operational | Yes | No | 100 | 2 |
| 6 | CLS-Commercial Loan System | Custom built | C#.Net | Data Issue | Job Rerun | abended job | 0 | Operational | Yes | No | 100 | 3 |

In one preferred embodiment, the base work pattern, as can be seen in above Tables 1-5, can be extracted in following steps. At first, the text data comprising, though not limiting, ticket description or other text fields, is pre-processed. In one example, pre-processing includes numeric, punctuation, extra whitespace, stop words and noise words removal from the text. Now, the processed data is converted into one word Term Document Matrix along with removal of terms, which occur less than pre-determined number of tickets, say for example 5 tickets. This is followed by computation of inverse document frequency (IDF) only for the remaining terms using following approach:

$$\text{Term IDF} = \log(\text{Total number of tickets/number of tickets containing the term}).$$

Following tables 6.1 and 6.2 explain in full exemplary way the above extraction.

TABLE 6.1

| TicketID | TicketDescription | desc_mod_text |
|---|---|---|
| 1 | Abended Job-VGTS_EC_NL_LMLWY_AM_IMP due to as of date mismatch | abended job vgtsecnllmlwyamimp date mismatch |
| 2 | Abended Job-VIRD_NTN_LWY_DLY_IMP due to as of date mismatch issue | abended job virdntnlwydlyimp date mismatch issue |
| 3 | Abended Job-VIRD_EC_LWY_DLY_IMP due to as of date mismatch issue | abended job virdeclwydlyimp date mismatch issue |
| 4 | Abended Job-VBRG_BHF_LOAN_POS_IMP due to timeout error | abended job vbrgbhfloanposimp timeout error |
| 5 | Abended Job-VBRG_ADX_POS_APAC_IMP due to timeout error | abended job vbrgadxposapacimp timeout error |
| 6 | Abended Job-VBRG_ADX_POS_APAC_IMP due to timeout error | abended job vbrgadxposapacimp timeout error |
| 7 | Abended Job-VBIR_BI_FACTORSYNC_3 | abended job vbirbifactorsync3 |
| 8 | Abended Job-VEDM_MASTER_PROCESS_MONTHEND | abended job vedmmasterprocessmonthend |
| 9 | Abended Job-VDRDB_EVREPRECON | abended job vdrdbevreprecon |
| 10 | [EXT] Delay Notification Email for the AMRS package and date May 29, 2018 | delay notification email amrs package date |

TABLE 6.2

| Ticket ID | abended | amrs | date | delay | email | error | issue | job | mismatch |
|---|---|---|---|---|---|---|---|---|---|
| 1 | 1 | 0 | 1 | 0 | 0 | 0 | 0 | 1 | 1 |
| 2 | 1 | 0 | 1 | 0 | 0 | 0 | 1 | 1 | 1 |
| 3 | 1 | 0 | 1 | 0 | 0 | 0 | 1 | 1 | 1 |
| 4 | 1 | 0 | 0 | 0 | 0 | 1 | 0 | 1 | 0 |
| 5 | 1 | 0 | 0 | 0 | 0 | 1 | 0 | 1 | 0 |
| 6 | 1 | 0 | 0 | 0 | 0 | 1 | 0 | 1 | 0 |
| 7 | 1 | 0 | 0 | 0 | 0 | 0 | 0 | 1 | 0 |
| 8 | 1 | 0 | 0 | 0 | 0 | 0 | 0 | 1 | 0 |
| 9 | 1 | 0 | 0 | 0 | 0 | 0 | 0 | 1 | 0 |
| 10 | 0 | 1 | 1 | 1 | 1 | 0 | 0 | 0 | 0 |

| Ticket ID | notification | package | Timeout | vbirbifactorsync3 | Vbrgadxposapacimp |
|---|---|---|---|---|---|
| 1 | 0 | 0 | 0 | 0 | 0 |
| 2 | 0 | 0 | 0 | 0 | 0 |
| 3 | 0 | 0 | 0 | 0 | 0 |

TABLE 6.2-continued

| | | | | | | |
|---|---|---|---|---|---|---|
| 4 | 0 | 0 | 1 | 0 | | 0 |
| 5 | 0 | 0 | 1 | 0 | | 1 |
| 6 | 0 | 0 | 1 | 0 | | 1 |
| 7 | 0 | 0 | 0 | 1 | | 0 |
| 8 | 0 | 0 | 0 | 0 | | 0 |
| 9 | 0 | 0 | 0 | 0 | | 0 |
| 10 | 1 | 1 | 0 | 0 | | 0 |

| TicketID | abended | job | Pattern | TicketID | abended | job | Pattern |
|---|---|---|---|---|---|---|---|
| 1 | 1 | 1 | abended | 6 | 1 | 1 | abended |
| 2 | 1 | 1 | abended | 7 | 1 | 1 | abended |
| 3 | 1 | 1 | abended | 8 | 1 | 1 | abended |
| 4 | 1 | 1 | abended | 9 | 1 | 1 | abended |
| 5 | 1 | 1 | abended | 10 | 0 | 0 | 0 |

Here, since only two terms are present in 5 tickets, the IDF score is computed for these two terms (abended, 'job') as:

$$\text{IDF score of term "abended" and "job"} = \log(10/9) = 0.105361$$

Logically, lower the IDF score, the better. If the IDF score is near to zero then the term is considered to occur more frequently across the tickets. So out of the available terms in the ticket, term with lowest IDF score will be tagged as pattern. In one example embodiment, if both terms have same score as like "abended" & "job", then the term appearing first in alphabetic order may be tagged.

Now, once the base work pattern is extracted, sub-work pattern extraction (shown in above Tables 1-5) is explained. Here, the tickets are clustered based on the base work pattern. The base work pattern is removed from the pre-processed text and converted into one word TDM. The terms that occur less than pre-determined number of tickets are filtered out and Inverse Document Frequency (IDF) is computed only for remaining terms. So out of the available terms in the ticket, term with lowest IDF score will be tagged as pattern.

The ML algorithm of the debt engine 20 allows above discussed noise elimination, token extraction and debt classification specific to customer's context and requirements. Drawing from above, the debt classifier 21 is configured to classify debts in one of pre-determined categories as shown in Table 7 below. The debt classifier 21 has the customization capability to read through various ticket data attributes of customer's choice.

TABLE 7

| Debt Category | Kinds of Debt |
|---|---|
| Technical Debt | Compromised code quality, code build, test, integration environment, depreciated infra, capacity issues, design quality, test quality, complexity metrics |
| Operational Debt | Lack of Process & Tools |
| Functional Debt | Limited/no features |
| Knowledge Debt | No documentation/limited awareness |

Debt engine's (20) machine-learning algorithm has the capability to scan the unstructured data and categorize the application debt into different categories by associating the tokens with its prior learning. The highly customizable AI driven debt engine 20 clusters the repeated and unique nature of debts and suggests the eliminable and automatable debts, as discussed in later section. Further, the debt engine 20 is customizable depending on the available ticket attributes for any customer and extendable from minimum of 5 parameters to max of 9 textual parameters.

In accordance with one specific embodiment of present disclosure, different deployment models such as On-premise, SAAS of the system are enabled. The security of data captured is enriched using data level encryption solutions such as Microsoft key vault. In addition, there are desktop utilities offered for supporting data sharing restrictions. As a pre-requisite, data sanitization check with pre-defined rule sets is performed to ensure data quality through a data credit rating. Importantly, multi-language support is also available. The attributes are defined depending on customer's data availability and maturity thereby allowing customization flexibility. The complete solution is, thus, contextualized to customer's environment and expertise.

Debt classifier 21 holds the extensive learning web 24 of clusters and rule engine for various domains and technologies. In one general embodiment, in an event an input file is received, it is determined if a past experience can be applied on such input file. Based on such prior experience, the input file is mapped as one of "having experience" or "not-having-experience". In one exemplary embodiment, the not-having-experience mapped input file is classified based on inputs from a subject matter expert. Debt classifier 21 is built with continuous learning methodology, which keeps enriching the rule definition on reading the ticket pattern on set frequency and redefining the classification rules.

The ML based automated categorization of debt remediation involves continuous identification of normal usage patterns and distinct problem type. Next, the debt remediation engine 30 creates unique healing ticket (H) for elimination opportunities and automation tickets (A) for automatable debts. The engine 30 has the capability to identify the similar nature of debt types and map it with existing healing and automation tickets. This clustering helps to identify the high potential automation and healing tickets and the savings. In case of change in patterns, system automatically delink/remap the tickets from healing and automation tickets to ensure that benefit estimation is accurate. The remediation engine 30, in addition to classification of debt remediation type, recommends prioritization of problem solving based on multiple parameters, including, but not limited to, current cost of debt, application criticality, volume of current user base or cost of permanent fixing of debt and so on so forth. To ease the return on investment, simplified estimation calculator is enabled with sizing of Simple, Medium and Complex with pre-filled investment. This facilitates a consistent and systematic approach towards not only identification and remediation of problems, but also for measuring progress.

Next, an end-to-end workflow of debt engine 20 is discussed. First, the ticket data is extracted from a ticket database 22 (as shown in FIG. 1) hosted on a server, and sent for validation. If the data do not meet validation criteria of textual data availability for sizable number of tickets, it is sent for correction and to be uploaded back into the ticket database server 22. However, if the data is valid, the user is notified of it. Next, the data is checked for any noise embedded therein. Accordingly, the noise elimination engine 23 (as shown in FIG. 1) receives the request for noise elimination. Post noise elimination, the debt engine 20 performs debt classification.

Now, if the debt classification requirements are not met, the system notifies the user of the same and requests the learning web 24 to run sampling by placing various input files. Hence, the sampling request is processed in accordance with process described in above paragraphs of disclosure. On the contrary, if the debt is classified, the machine learning based rules are executed thereupon for debt category and treatment methods.

In one significant embodiment of present disclosure, the classified debt moves next to debt remediation engine 30 to trigger automation and healing tickets. Accordingly, the debt remediation engine 30 creates healing and automation tickets based on a plurality of parameters related to multi-dimensional flexible ticket attributes, and captures repeated ticket count thereby saving on both efforts invested and cost incurred. Further, the debt remediation engine 30 is configured to read debt classification and remediation suggestions. The debt remediation engine 30 clusters the repeated patterns of debt based on the dynamic set of attributes configured by the users, followed by validation of cluster level threshold, and creates automation and healing tickets. On continuous upload of ticket data, debt remediation engine 30 looks for available automation and healing tickets and auto tagging to existing remediation tickets. In the event of new pattern received, debt remediation engine 30 will create a new ticket. Debt remediation clustering attributes can vary from 5-9 in numbers depending on the richness of data availability. Some of the examples of debt remediation flexible parameters may be application, technology, known error ID, country of origin, infrastructure IDs, job name, business process involved, work log, etc.

Based on above validation, the corresponding healing or automation workflow is triggered in a healing and automation workbench. In healing workbench, for a new eliminable use case, a new healing ticket is created, and the existing eliminable use cases will be auto-linked with an existing healing ticket. On the other hand, the automation workbench also creates a new automation ticket for a new automatable use case. Existing automatable use cases will be auto-linked with existing automation ticket. Debt remediation engine 30 continuously monitors the linkage of use cases to healing and automation tickets and spots the dormancy. If the similar use case is not repeated within a stipulated timeframe, it notifies users on dormancy to exclude those opportunities from their planning and focus on much needed opportunities. In one working example, the debt remediation engine 30 is equipped with 2000+ BOT solutions to suggest the suitable reusable solutions for the automation opportunities. Next, the detailed debt analysis at application portfolio level is presented on reporting dashboard 40. This also presents a user-friendly interface for convenient adoption and platform based governance. Healing and automation workbench has the simplified role based workflows to plan the implementation and track the progress.

The platform driven ML algorithm, therefore, effectively find, categorize and remediate problems in a repeatable, consistent manner that delivers predictable, verifiable results with respect to application behavior. This eliminates the need to constantly re-invent processes to identify the sources and costs of application issues, to decide which are worth addressing first, and individually fix multiple issues caused by common causes.

The foregoing description is a specific embodiment of the present disclosure. It should be appreciated that this embodiment is described for purpose of illustration only, and that those skilled in the art may practice numerous alterations and modifications without departing from the spirit and scope of the invention. It is intended that all such modifications and alterations be included insofar as they/come within the scope of the invention as claimed or the equivalents thereof.

We claim:

1. A system for application maintenance, the system comprising:

a memory storing program instructions for performing application maintenance;

a processor configured to execute the program instructions stored in the memory, wherein the processor is trained based on machine learning-based rules and parameters that include reading a ticket pattern on a set frequency and redefining of machine learning-based classification rules based on the ticket pattern to create a healing and an automation ticket, thereby the processor is built with a continuously learning methodology, and the trained processor is configured to:

read ticket data and operational data to identify issues from the ticket and operational data based on captured attributes of the ticket data and operational data, wherein the trained processor is configured to contextually eliminate noise from the ticket data;

automatically classify the identified issues into one or more categories based on a first set of parameters and machine-learning-based classification rules; and prioritize the classified issues based on a second set of parameters, wherein the trained processor determines when a past experience is applicable to the prioritized classified issues, and wherein on the basis of the determination the trained processor creates the healing ticket and the automation ticket by mapping an eliminable ticket data associated with the prioritized classified issues with an existing healing ticket and an automation ticket respectively, based on a plurality of parameters related to multi-dimensional flexible ticket attributes previously used for training the processor, and wherein the trained processor automatically delinks the eliminable ticket data from the created healing ticket and the automation ticket respectively in the event a change in pattern associated with the ticket data and the operational data or a combination thereof is determined.

2. The system as claimed in accordance with claim 1, wherein the ticket data and the operational data comprise ticketed and non-ticketed unstructured data.

3. The system as claimed in accordance with claim 1, wherein the processor is configured to integrate with a learning web of debt classification rules to categorize the identified issues based on technology, domain, nature of issue, root cause of problem and resolution methodology.

4. The system as claimed in accordance with claim 1, wherein the attributes of the ticket and the operational data comprise technology name, ticket description, cause code, resolution method, base work pattern for pattern determination, sub work patterns or a combination thereof.

5. The system as claimed in accordance with claim 1, wherein the first set of parameters comprises of usage patterns and problem types associated with the ticket data and the operational data or a combination thereof.

6. The system as claimed in accordance with claim 1, wherein the machine learning-based rules are selected from one or more of: latent semantic analysis, graphical clustering, DB scan clustering, association rule mining, stratified sampling, SVM classifier, IDF based information extractor, Jaccard similarity, rule-based classification or a combination thereof.

7. The system as claimed in accordance with claim 1, wherein the second set of parameters comprises current cost of debt, cost of permanent fixing of debt or a combination thereof.

8. The system as claimed in accordance with claim 1, wherein the processor creates the healing ticket and the automation ticket based on a plurality of parameters comprising application name, technology, known error ID, country of origin, infrastructure IDs, job name, business process involved, work log or a combination thereof.

9. The system as claimed in accordance with claim 1, wherein the processor is configured to cluster debt types of similar nature and recommends prioritization of remediation based on a plurality of parameters comprising current cost of debt, application criticality, volume of current use base or cost of permanent fixing of debt or a combination thereof.

10. A method for application maintenance, the method implemented by a processor in communication with a memory, the method comprising:
   training the processor based on machine learning-based rules and parameters including reading a ticket pattern on a set frequency and redefining of machine learning-based classification rules based on the ticket pattern to create a healing and an automation ticket, thereby the processor is built with a continuously learning methodology, and
   reading, by the trained processor, ticket and operational data to identify issues from the ticket and operational data based on captured attributes of the ticket data and operational data, wherein noise is eliminated from the ticket data contextually;
   automatically classifying, by the trained processor, the identified issues into one or more categories based on a first set of parameters and machine learning-based classification rules;
   prioritizing, by the trained processor, the classified issues based on a second set of parameters;
   determining, by the trained processor, if a past experience is applicable to the prioritized classified issues; and
   creating, by the trained processor, the healing ticket and the automation ticket based on the determination by mapping an eliminable ticket data associated with the prioritized classified issues with an existing healing ticket and an automation ticket respectively, based on a plurality of parameters related to multi-dimensional flexible ticket attributes previously used for training the processor, wherein the eliminable ticket data is automatically delinked from the healing ticket and the automation ticket respectively, in the event a change in pattern associated with the ticket data and the operational data or a combination thereof is determined.

11. The method as claim in accordance with claim 10, wherein the ticket data and the operational data comprise ticketed and non-ticketed unstructured ticket data.

12. The method as claimed in accordance with claim 10, wherein the identified issues are categorized based on technology, domain, nature of issue, root cause of problem and resolution methodology.

13. The method as claimed in accordance with claim 10, wherein the attributes of the ticket and the operational data comprise technology name, ticket description, cause code, resolution method, base work pattern for pattern determination, sub work patterns or a combination thereof.

14. The method as claimed in accordance with claim 10, wherein the first set of parameters comprises usage patterns and problem type associated with the ticket and the operational data or a combination thereof.

15. The method as claimed in accordance with claim 10, wherein the identified issues are classified based on machine learning techniques selected from one or more of: latent semantic analysis, graphical clustering, DB scan clustering, association Rule mining, stratified sampling, SVM classifier, IDF based information extractor, Jaccard similarity, rule-based classification or a combination thereof.

16. The method as claimed in accordance with claim 10, wherein the second set of parameters comprises current cost of debt, cost of permanent fixing of debt or a combination thereof.

17. The method as claimed in accordance with claim 10, wherein the plurality of parameters for creating the healing and the automation tickets comprises application name, technology, known error ID, country of origin, infrastructure IDs, job name, business process involved, work log or a combination thereof.

18. The method as claimed in accordance with claim 10, wherein the method comprises clustering debt types of similar nature and recommending prioritization of remediation based on a plurality of parameters comprising current cost of debt, application criticality, volume of current use base or cost of permanent fixing of debt or a combination thereof.

19. The method as claimed in accordance with claim 10, wherein the plurality of parameters for creating the healing and the automation tickets comprises application name, technology, known error ID, country of origin, infrastructure IDs, job name, business process involved, work log or a combination thereof.

20. The method as claimed in accordance with claim 10, wherein the method comprises clustering debt types of similar nature and recommending prioritization of remediation based on a plurality of parameters comprising current cost of debt, application criticality, volume of current use base or cost of permanent fixing of debt or a combination thereof.

* * * * *